Patented Mar. 17, 1953

2,632,029

UNITED STATES PATENT OFFICE 2,632,029

PRESERVATION OF TERTIARY HALIDES WITH ANHYDROUS CARBONATES

Francis E. Condon, Bartlesville, Okla., assignor to Phillips Petroleum Company, a corporation of Delaware No Drawing. Application July 25, 1950, Serial No. 175,859

6 Claims. (Cl. 260—652.5)

This invention relates to the stabilization of tertiary aliphatic halides against decomposition, as during storage. In one of its aspects the invention relates to stabilization against decomposition of tertiary aliphatic halides, for example tertiary alkyl chloride, employing a substance in a form and manner not heretofore employed for the stabilization of any halogenated, more specifically chlorinated, hydrocarbon.

Tertiary alkyl halides are valuable chemical reagents on account of their high reactivity. They may be used as alkylating agents, as intermediates in the preparation of pure olefins, for the preparation of other tertiary halides, and as reagents in many other reactions. The chemical instability of tertiary halides is a recognized disadvantage that accompanies the chemical reactivity. Tertiary alkyl halides decompose during storage to yield the corresponding olefin and the hydrogen halide. This decomposition is evidenced by an increase in pressure (especially when the corresponding olefin is normally gaseous), by the presence of free hydrogen halide, which corrodes containers, and, sometimes, by the appearance of two separate liquid phases. This last-named phenomenon may come about by the attraction of free hydrogen halide toward atmospheric moisture, thus forming an aqueous solution of hydrogen halide. The decomposition of the halide appears to be catalyzed by moisture and/or free hydrogen halide and thus may be autocatalytic, once it has begun.

This pronounced tendency to decompose has necessitated preparation of the desired tertiary halide at or near the time of use. This is inconvenient, and a means of stabilizing the tertiary alkyl halides is obviously desirable.

I have found that the presence of the anhydrous carbonates of the alkali metals renders tertiary halides stable for a long period of time. Suitable carbonates are those of lithium, sodium, potassium, rubidium, and cesium. Ammonium carbonate may be used, but it is less desirable because it is unstable itself. On account of ready availability, anhydrous sodium and potassium carbonates are now preferred.

This invention is most widely applicable to tertiary aliphatic chlorides and fluorides, especially the chlorides, although benefit may be realized with the bromides and iodides. The instability of tertiary aliphatic halides generally increases with increasing atomic weight of the halogen, the iodides being the least stable. Specific aliphatic halides included in the scope of the invention are t-butyl chloride, t-amyl chloride, 2-chloro-2,3-dimethylbutane, 3-chloro-2,2,3-trimethylpentane, 3-chloro-3-methyl-1-butene, 4-chloro-2,3,4-trimethyl-2-pentene; others, including the corresponding fluorides, bromides, and iodides, will be recognized readily by the skilled organic chemist. Also included in the scope of the invention are the aryl-, cycloalkyl-, and cycloalkenyl-substituted tertiary aliphatic halides. For purposes of tertiary halide chemistry, these may be considered as tertiary aliphatic halides. Examples of such halides are: 1-phenyl-3-methyl-3-chlorobutane; 2-cyclopentyl-4-methyl-4-chloropentane; 1-alpha-naphthyl-3-chloro-3,4-dimethylpentane; 1-cyclohexenyl-2-chloro-2-methylpropane; and the corresponding fluorides, bromides, and iodides.

The amount of anhydrous carbonate added as preservative to the tertiary halide may vary over a wide range. Ordinarily, 1 to 50 weight per cent, based on the tertiary halide, will give good results. Higher, or lower amounts may be used, however. It is ordinarily desirable to maintain the tertiary halide at a temperature not substantially higher than 120° F. during storage.

*Example*

Several samples of t-butyl chloride were prepared and were stored in uncolored glass containers provided with stoppers. To several of the samples, small amounts (1 to 10 per cent by weight of the t-butyl chloride) of solid, anhydrous potassium carbonate were added. No preservative was added to the others. After several weeks, the samples without potassium carbonate had decomposed appreciably, as evidenced by the presence of an additional liquid phase, chemical attack on the stoppers, and a noticeable HCl odor. The samples containing the potassium carbonate showed only a single homogeneous liquid phase, no HCl odor, no chemical attack on stoppers, and no vapor pressure increase (e. g. resulting from formation of isobutylene or $CO_2$), even after a storage period of several months.

Reasonable variation and modification are possible within the scope of the foregoing disclosure and the appended claims to the invention the essence of which is that anhydrous alkali metal carbonates have been found to be preeminently suitable for the stabilization against decomposition of tertiary aliphatic halides as set forth.

I claim:

1. A method of stabilizing a tertiary alkyl monohalide which comprises adding thereto an anhydrous carbonate of an alkali metal.

2. A method of stabilizing a tertiary alkyl monohalide selected from the group consisting of tertiary alkyl chloride and tertiary alkyl fluoride which comprises adding thereto an anhydrous carbonate of an alkali metal.

3. A method for stabilizing tertiary butyl chloride which consists of adding to said chloride 1 to 10 per cent by weight of solid anhydrous potassium carbonate.

4. A stabilized tertiary alkyl monohalide containing in admixture therewith an anhydrous carbonate of an alkali metal.

5. Stabilized tertiary butyl chloride containing 1 to 10 per cent by weight of a solid anhydrous carbonate of an alkali metal.

6. Stabilized tertiary butyl chloride containing 1 to 10 per cent by weight of solid anhydrous potassium carbonate.

FRANCIS E. CONDON.

REFERENCES CITED

The following references are of record in the file of this patent:

UNITED STATES PATENTS

| Number | Name | Date |
| --- | --- | --- |
| 2,043,257 | Missbach | June 9, 1936 |
| 2,046,986 | Winkelmann | July 7, 1936 |
| 2,435,887 | Hornbacher et al. | Feb. 10, 1948 |